United States Patent [19]
Fritsche et al.

[11] 4,273,430
[45] Jun. 16, 1981

[54] PHOTOGRAPHIC CAMERA

[75] Inventors: Rainer Fritsche, Wetzlar;
Klaus-Dieter Schaefer, Braunfels,
both of Fed. Rep. of Germany

[73] Assignee: Ernst Leitz Wetzlar GmbH, Wetzlar,
Fed. Rep. of Germany

[21] Appl. No.: 167,370

[22] Filed: Jul. 10, 1980

Related U.S. Application Data

[63] Continuation of Ser. No. 958,067, Nov. 6, 1978, abandoned.

[30] Foreign Application Priority Data

Nov. 9, 1977 [DE] Fed. Rep. of Germany ....... 2750068

[51] Int. Cl.³ .......................... G01P 3/36; G03B 17/20
[52] U.S. Cl. ..................................... 354/31; 354/60 E;
356/28
[58] Field of Search .................. 354/22, 23 R, 25, 31,
354/60 R, 60 E; 356/28; 358/105

[56] References Cited

U.S. PATENT DOCUMENTS

| | | | |
|---|---|---|---|
| 2,413,349 | 12/1946 | Hancock, Jr. et al. ................ | 354/66 |
| 3,399,307 | 8/1968 | Levin .................................... | 250/224 |
| 3,690,234 | 9/1972 | Costianes ........................... | 354/23 R |
| 3,975,631 | 8/1976 | Takeda ............................... | 354/25 X |
| 4,039,824 | 8/1977 | Nanba ................................ | 354/25 X |
| 4,047,022 | 9/1977 | Holle .................................. | 354/25 X |
| 4,071,297 | 1/1978 | Leitz et al. ......................... | 356/28 X |
| 4,110,042 | 8/1978 | Leitz .................................. | 356/28 X |

*Primary Examiner*—Michael L. Gellner
*Attorney, Agent, or Firm*—Schwartz, Jeffery, Schwaab, Mack, Blumenthal & Koch

[57] ABSTRACT

A photographic camera with an electrical circuit for generating an electric signal proportional to the relative motion between the object sighted and the camera. The camera has a control circuit which receives the generated signal and provides an output signal which is fed to a display and/or control device. An indicator is provided to the user of the camera for indicating whether the exposure time is set too long for the relative motion present between the object and the camera. Automatic control of the camera is also provided. Individual photosensor elements are arranged in two alternately connected groups within the electrical circuit. The individual photosensor elements may also be arranged in two substantially perpendicular directions to provide a relative motion signal corresponding to two dimensional movement between the object to the photographed and the camera.

6 Claims, 3 Drawing Figures

PHOTOGRAPHIC CAMERA

This is a continuation of application Ser. No. 958,067 filed Nov. 6, 1978, abandoned.

BACKGROUND OF THE INVENTION

The invention concerns a photographic camera with a device producing an electric signal proportional to the relative motion between the object being sighted and the camera. The device comprises an evaluating circuit to receive said signal and to generate an output signal as a function of additional parameters. The output signal is fed to display and/or control means, which either indicate to the user of the camera that the exposure time is set too long for the relative motion existing between the camera and the object and/or serve to automatically set the shutter or the exposure time, respectively, of the camera in relation to said relative motion. The automatic shutter or exposure time control mechanism may be that as described in U.S. application Ser. No. 929,723, filed July 31, 1978, incorporated herein by reference.

The above cited patent application discloses as the means for generating a signal proportional to the relative motion between the camera and the object an imaging optical device, a stationary grating mounted at least in the vicinity of the image plane of said optical device and a photoelectric receiver system following in series. An additional prior art device showing a camera having means for generating an electrical signal proportional to the relative motion between the object sighted and the camera is found in U.S. Pat. No. 2,413,349, incorporated herein by reference.

SUMMARY OF THE INVENTION

In one embodiment of the invention, as the means for generating a signal proportional to the relative motion there is provided an imaging optical device and a photoelectrical receiver assembly arranged at least in the vicinity of the image plane of said optical device. The individual receivers of the receiver assembly are divided into two groups and connected in alternating series, whereby the sum signal of each group is fed to the input of an operational amplifier which in turn generates a signal from the difference, said signal being fed into the evaluating circuit.

However, a receiver assembly of this type, in which the receivers are arranged in one direction adjacently to each other, is capable of detecting relative motion in one dimension, e.g. the horizontal direction, only. In actual practice, however, lateral and vertical motions are equally encountered. For this reason, as a further embodiment of the invention, the individual receivers of the photoelectric receiver assembly are arranged adjacently to each other in two essentially perpendicular directions. The receivers are connected in an alternating sequence for both directions so that a checkerboard-like arrangement of the receivers is obtained.

Consequently, the invention is directed toward a photographic camera apparatus having photosensor means for receiving light from an object to be photographed, circuit means including said photosensor means for generating an electrical signal proportional to the degree of relative movement between the object to be photographed and the camera, means for generating a control signal in response to the relative movement electrical signal and at least one additional camera setting signal, and indicator means responsive to the control means for indicating an unacceptable camera setting, wherein the improvement comprises an imaging optical device for imaging the object to be photographed and a plurality of individual photosensors positioned at least in the vicinity of the image plane of the imaging optical device, the circuit means including an operational amplifier and means for connecting alternate ones of said individual photosensors to inputs of said operational amplifier.

BRIEF DESCRIPTION OF THE DRAWINGS

The invention is more fully described in reference to the following description taken in conjunction with the drawings wherein.

DETAILED DESCRIPTION OF THE PREFERRED EMBODIMENT

Figure 1:
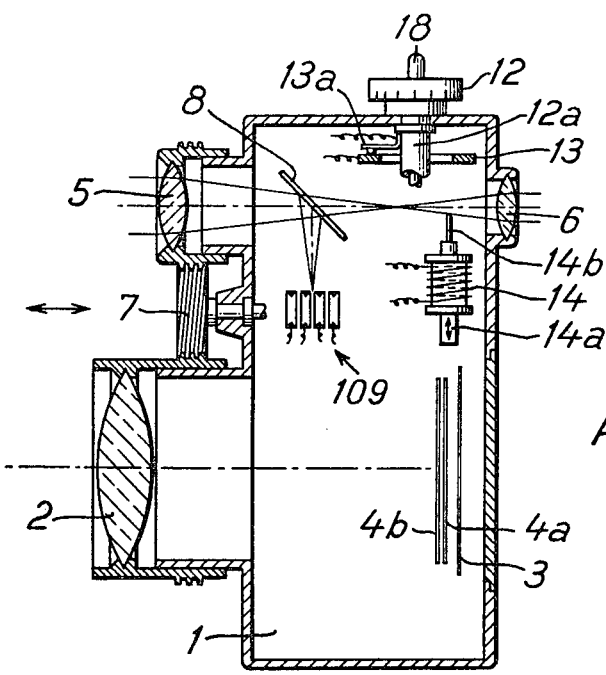
FIG. 1 is a diagram of a camera with a photoelectric receiver assembly for generating an electric signal proportional to the relative motion, having a display device.

In FIG. 1, the symbol 1 indicates the housing of the camera, said housing being equipped with an exposure lens 2. In a manner known and therefore not shown in detail, the camera has a film plane 3, in front of which a shutter, e.g. a focal plane shutter with the curtains 4a, 4b is arranged.

The camera further possesses a view finder with lens 5 and an eyepiece 6. The finder lens 5 is connected by means of a gear 7 with the exposure lens 2, which may be exchangeable, and may be displaced in the direction of the double arrow for the purpose of common focusing. In the path of the finder beam, a partially permeable mirror 8 is arranged, which reflects part of the incident light onto a photoelectric receiver assembly 109, so that the finder lens 5 projects an image of the object, not shown, onto the photoelectric receiver assembly 109. In this manner, the photoelectric receiver assembly generates an electric signal proportional to the relative motion between the camera and the object.

The camera further has a setting knob 12. This knob is mounted on a shaft 12a which, during the setting of the exposure time, is rotatable together with the setting knob. The wiper 13a of a potentiometer 13 is connected with the shaft 12a, so that an electric signal proportional to the exposure time set, is taken off the potentiometer during the setting of the time of the exposure. A display device is further provided, which consists of a magnet 14 with a core 14a and an indicator 14b, mounted on said core. A more detailed explanation of the foregoing mechanism may be found in the aforementioned patent application Ser. No. 929,723.

Figure 2:
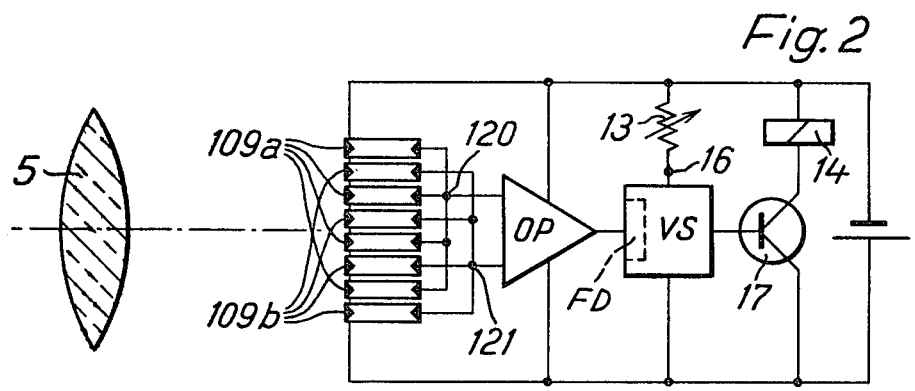
FIG. 2 is a circuit diagram of the camera according to FIG. 1.

The circuit of the photoelectric receiver assembly 109 may be seen best in FIG. 2. The assembly consists of the photoreceivers 109a and 109b alternately arranged adjacent to each other. The plurality of photoreceivers are alternately interconnected to form two groups. All of the receivers 109a in one group are connected with each other in parallel, and all of the receivers 109b are in the second group similarly connected in parallel. The two summation points 120 and 121 of the first and second groups are each connected to an input of an operational amplifier OP. During relative motion between the object and the camera the receivers 109a and 109b generate alternating electrical signals, the frequency of said alternating signals being proportional to the velocity of said relative motion. In the operational amplifier OP, the sum or difference, respectively, of these signals is formed, wherein direct signal components are suppressed. At the output of the amplifier OP there is generated a pure amplified alternating signal the frequency of which is proportional to the relative motion. This signal is conducted to a differential circuit VS, which contains as its input portion a frequency discriminator FD, known in itself; said frequency discriminator initially converting the alternating signal into a frequency dependent direct current signal. The differential circuit VS further receives a signal proportional to the time of exposure, available at the point 16 and taken off the potentiometer 13.

If now, for example, a signal proportional to the relative motion exceeds the signal proportional to the exposure time set, the differential circuit VS which serves as a comparator and trigger circuit may be affected so that it generates a signal causing the normally blocked transistor 17 to become conducting, thus applying voltage to the magnet 14. The latter becomes activated and draws the core 14a farther into the coil, whereby the indicator 14b is moved into the path of the finder beam, thereby alerting the user that for this velocity of the object the exposure time chosen is excessive.

Figure 3:
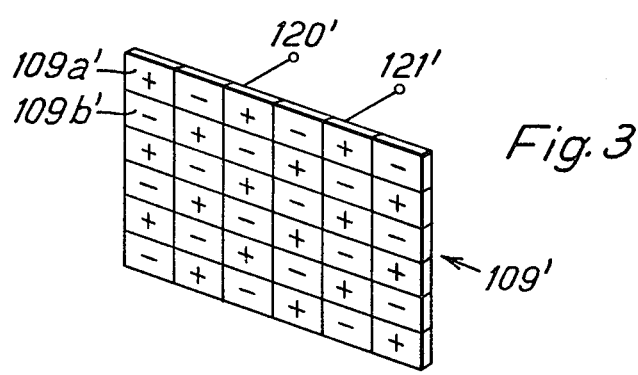
FIG. 3 is a diagram of the checkerboard like arrangement of the individual photoelectric receivers in the receiver assembly.

FIG. 3 shows diagrammatically a receiver assembly 109', the individual receivers 109a' and 109b' of which are arranged alternatingly adjacent to each other, not merely in one, but in two mutually perpendicular directions. This results for the entire receiver assembly in a checkerboard-like arrangement. For the sake of simplicity of representation, all of the receivers 109a' are designated by + and all of the receivers 109b' with —, and all of them are connected together at the summation points 120' and 121', respectively. The rest of the circuit is as represented in FIG. 2.

With a receiver assembly as shown in FIG. 3, as already described hereinabove, relative motions between the camera and the object may be detected not only in one direction, but in two mutually perpendicular directions, i.e. for example in the horizontal and the vertical direction.

The foregoing detailed description is to be clearly understood as given by way of illustration and example only, the spirit and scope of this invention being limited solely by the appended claims.

What is claimed is:

1. A photographic camera apparatus comprising:
   circuit means including photosensor means for generating an electrical signal proportional to the degree of relative movement between an object to be photographed and said camera apparatus,
   an imaging optical device having an image plane for imaging the object to be photographed,
   means for generating a control signal in response to said relative movement electrical signal,
   indicator means responsive to said control signal for indicating an unacceptable camera setting,
   means mounting said photosensor means at least in the vicinity of the image plane of said imaging optical device,
   said photosensor means comprising a plurality of individual photosensors arranged in two mutually perpendicular directions forming a photosensor matrix,
   said circuit means comprising operational amplifier means having first and second inputs and an output connected to said means for generating,
   means parallelly interconnecting alternate ones of said individual photosensors of said matrix forming thus a first and a second group generating first and second electrical sum signals, respectively, and
   means connecting said first and second electrical sum signals to said first and second inputs, respectively, of said operational amplifier means.

2. In a photographic camera apparatus as recited in claim 1 wherein said individual photosensors are arranged in two substantially perpendicular directions.

3. In a photographic camera apparatus as recited in claim 2 wherein said individual photosensors form a checkerboard-like arrangement.

4. A photographic camera apparatus having an aperture with a controllable aperture setting means, a shutter release means, and a controllable exposure time setting means, said camera apparatus comprising:
   circuit means including photosensor means for generating an electrical signal proportional to the degree of relative movement between an object to be photographed and said camera apparatus,
   an imaging optical device having an image plane for imaging the object to be photographed,
   means for generating a control signal in response to said relative movement electrical signal,
   control means, responsive to said control signal, for automatically controlling at least one of said shutter release means, aperture setting means and exposure time setting means,
   means mounting said photosensor means at least in the vicinity of the image plane of said imaging optical device,
   said photosensor means comprising a plurality of individual photosensors arranged in two mutually perpendicular directions forming a photosensor matrix,
   said circuit means comprising operational amplifier means having first and second inputs and an output connected to said means for generating,
   means parallelly interconnecting alternate ones of said individual photosensors of said matrix for forming thus a first and a second group generating first and second electrical sum signals, respectively, and
   means connecting said first and second electrical sum signals to said first and second inputs, respectively, of said operation amplifier means.

5. In a photographic camera as recited in claim 4 wherein said individual photosensors are arranged in two substantially perpendicular directions.

6. In a photographic camera as recited in claim 5 wherein said individual photosensors form a checkerboard-like arrangement.

* * * * *